United States Patent [19]

Schaeffer et al.

[11] Patent Number: 5,524,190
[45] Date of Patent: Jun. 4, 1996

[54] COMMAND OBJECT LOGGING SYSTEM FOR RESTORING DOCUMENTS

[75] Inventors: Arnold Schaeffer, Belmont; Jack H. Palevich, Sunnyvale; David R. Anderson, Cupertino; Larry S. Rosenstein, Santa Clara, all of Calif.

[73] Assignee: Taligent, Inc., Cupertino, Calif.

[21] Appl. No.: 73,229

[22] Filed: Jun. 4, 1993

[51] Int. Cl.$^6$ .............................. G06T 1/00; G06F 12/16
[52] U.S. Cl. ............... 395/146; 395/182.03; 395/182.13; 395/183.01
[58] Field of Search .................... 395/144–146, 395/151, 161, 145–147, 181, 182.03, 182.13, 182.18, 183.01, 185.01; 371/12, 10.1; 364/419.17, 419.19, 225.8, 943.5

[56] References Cited

U.S. PATENT DOCUMENTS

| | | | |
|---|---|---|---|
| 4,507,751 | 3/1985 | Gawlick et al. | 364/900 |
| 4,821,220 | 4/1989 | Duisberg | 364/578 |
| 4,885,717 | 12/1989 | Beck et al. | 395/775 |
| 4,891,630 | 1/1990 | Friedman et al. | 345/156 |
| 4,945,474 | 7/1990 | Elliott et al. | 364/200 |
| 4,953,080 | 8/1990 | Dysart et al. | 395/600 |
| 4,974,173 | 11/1990 | Stefik et al. | 364/521 |
| 5,041,992 | 8/1991 | Cunningham et al. | 395/135 |
| 5,043,866 | 8/1991 | Myre, Jr. et al. | 364/200 |
| 5,050,090 | 9/1991 | Golub et al. | 364/478 |
| 5,060,276 | 10/1991 | Morris et al. | 382/151 |
| 5,072,412 | 12/1991 | Henderson, Jr. et al. | 395/159 |
| 5,075,848 | 12/1991 | Lai et al. | 395/479 |
| 5,089,958 | 2/1992 | Horton et al. | 395/575 |
| 5,093,914 | 3/1992 | Coplien et al. | 395/700 |
| 5,107,443 | 4/1992 | Smith et al. | 395/158 |
| 5,119,475 | 6/1992 | Smith et al. | 395/156 |
| 5,121,478 | 6/1992 | Rao | 395/157 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/183.03 |
| 5,150,458 | 9/1992 | Masuzaki et al. | 395/135 |
| 5,151,987 | 9/1992 | Abraham et al. | 395/182.18 |
| 5,159,669 | 10/1992 | Trigg et al. | 395/159 |
| 5,181,162 | 1/1993 | Smith et al. | 364/419.19 |

FOREIGN PATENT DOCUMENTS

| | | |
|---|---|---|
| 0097239 | 1/1984 | European Pat. Off. . |
| 0098928 | 1/1984 | European Pat. Off. . |
| 0280773 | 9/1988 | European Pat. Off. . |
| 0465018 | 1/1992 | European Pat. Off. . |
| 0483038 | 4/1992 | European Pat. Off. . |

OTHER PUBLICATIONS

Bertrand Meyer "Object Oriented Software Construction", Prentice Hall Ltd. 1988, pp. 285–290.

Software Practice & Experience, V.17(11) Nov. 1987, GB, pp. 813–845, Pike "The Text Editor SAM".

IBM Technical Disclosure Bulletin, V.33(12), May 1991, NY, US, pp. 304–305 "Unsaved Changes Tool for Object-Oriented Programming Environment".

Fourth Annual Symposium on User Interface Software and Technology, Nov. 11, 1991, pp. 107–115, Wang & Green "An Event-Object Recovery Model for Object-Oriented User Interfaces".

Operating Systems Review (SIGOPS), V.25(4), Oct. 1991, US, pp. 77–87, Lam "An Implementation for Small Databases with High Availability".

11th Symposium on Reliable Distributed Systems, Oct. 5, 1992, US, pp. 139–146 Ruffin "Kitlog: A Generic Logging Service".

*Primary Examiner*—Heather R. Herndon
*Assistant Examiner*—Joseph H. Feild

[57] ABSTRACT

A method and system for automatically saving changes of a document as they occur is disclosed. An object oriented framework is used to facilitate the processing and assure document integrity throughout the processing.

16 Claims, 5 Drawing Sheets

COMMAND OBJECT LOGGING SYSTEM FOR RESTORING DOCUMENTS

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application U.S. patent application Ser. No. 07/996,171, now abandoned and continued as U.S. patent application Ser. No. 08/482,314, entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

This invention generally relates to improvements in computer systems and more particularly to a system and method for a high availability document processing system.

BACKGROUND OF THE INVENTION

Document processing is currently the most prevalent application of computer technology. Examples of state of the art word processing technology include the WordPerfect® text processor and the Word text processor from Microsoft® Corporation. These products are designed to run on various operating systems and different hardware platforms. Some of the hardware platforms and operating systems are less reliable then others. To avoid loss of data or other information, these products have a backup capability that can be enabled at system setup. The backup occurs when a user specified time elapses, if a user selects to enable the capability. If the system has a failure between backups, then the information since the last backup is lost.

SUMMARY OF THE INVENTION

Accordingly, it is a primary objective of the present invention to provide a system and method for automatically saving a document by applying object oriented technology to document processing. The system automatically saves changes of a document as objects that are logged to a non-volatile store. Then, in the event of a power-loss or other problem, the document has the changes applied in the order they were saved on the log to recreate the document.

DETAILED DESCRIPTION OF THE INVENTION

Figure 1:
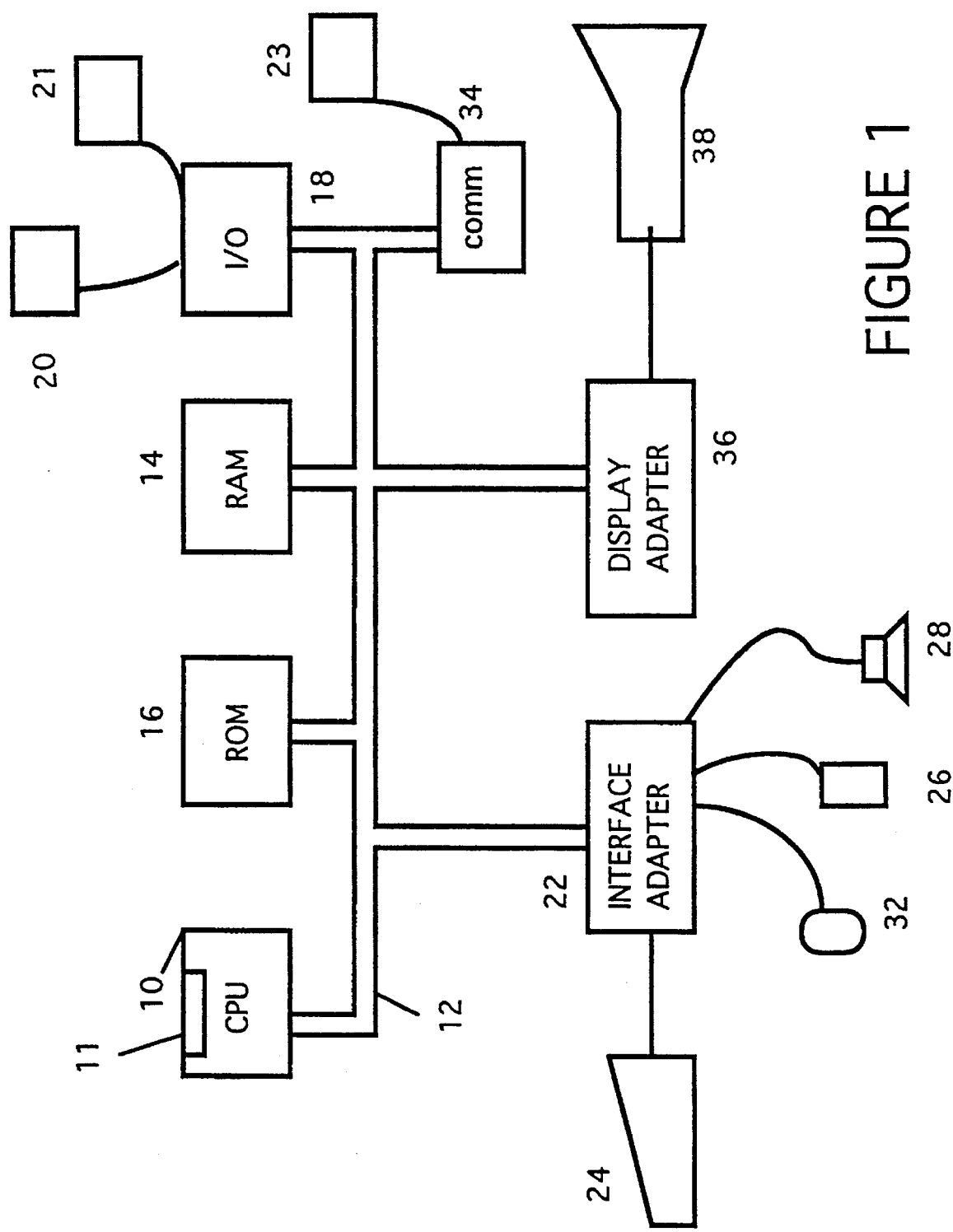
FIG. 1 is a block diagram of a personal computer system in accordance With a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multimedia framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, an application program resident in the RAM 14, and under the control of the CPU 10, is responsible for managing various tasks using an object oriented document framework.

Other systems, such as the Apple Macintosh System 7, use a model that requires a user to explicitly save a document. In these systems, the user opens a document, makes some changes, and saves the document. Usually, the new version of the document replaces the old one, although some applications keep one or more past saved versions.

Until the user saves, the changes made exist only inside the application. If the application or system crashes, those changes are lost. Some applications store parts of their data on disk and the user may be able to recover something from those disk files. Some applications (e.g., Quicken and HyperCard on the Macintosh) effectively do an automatic save each time the user changes something. This processing prevents the user from losing work due to a crash, but the user can lose work due to an unwanted change. Other applications checkpoint a document in a separate file when the user switches pages. This prevents the user from losing work on other pages, but does nothing to prevent losing work on the active page.

Saveless Model

A preferred embodiment checkpoints each change to the document and logs it to disk. In the event of a crash, the system starts with the last "saved" version and replays all the changes the user made against the copy to restore the document. The resulting document is identical to the document the user had at the time of the crash. In effect, the system automatically stores a saved image and a command log. The saved image records the state of the entire document at a certain point in time, and the command log records all changes to the document since that time.

The basic flow of control when the user is editing the document is as follows:

Each time a user makes a change to a document, a copy of the command object that represents the change is placed onto the end of a queue.

A separate background task takes the command objects off the queue and saves them into the command log. This task executes at a lower priority to enable this action to execute when the user isn't interacting with the system to minimize impact to user productivity.

The command object is processed normally to change the document.

Figure 2A:
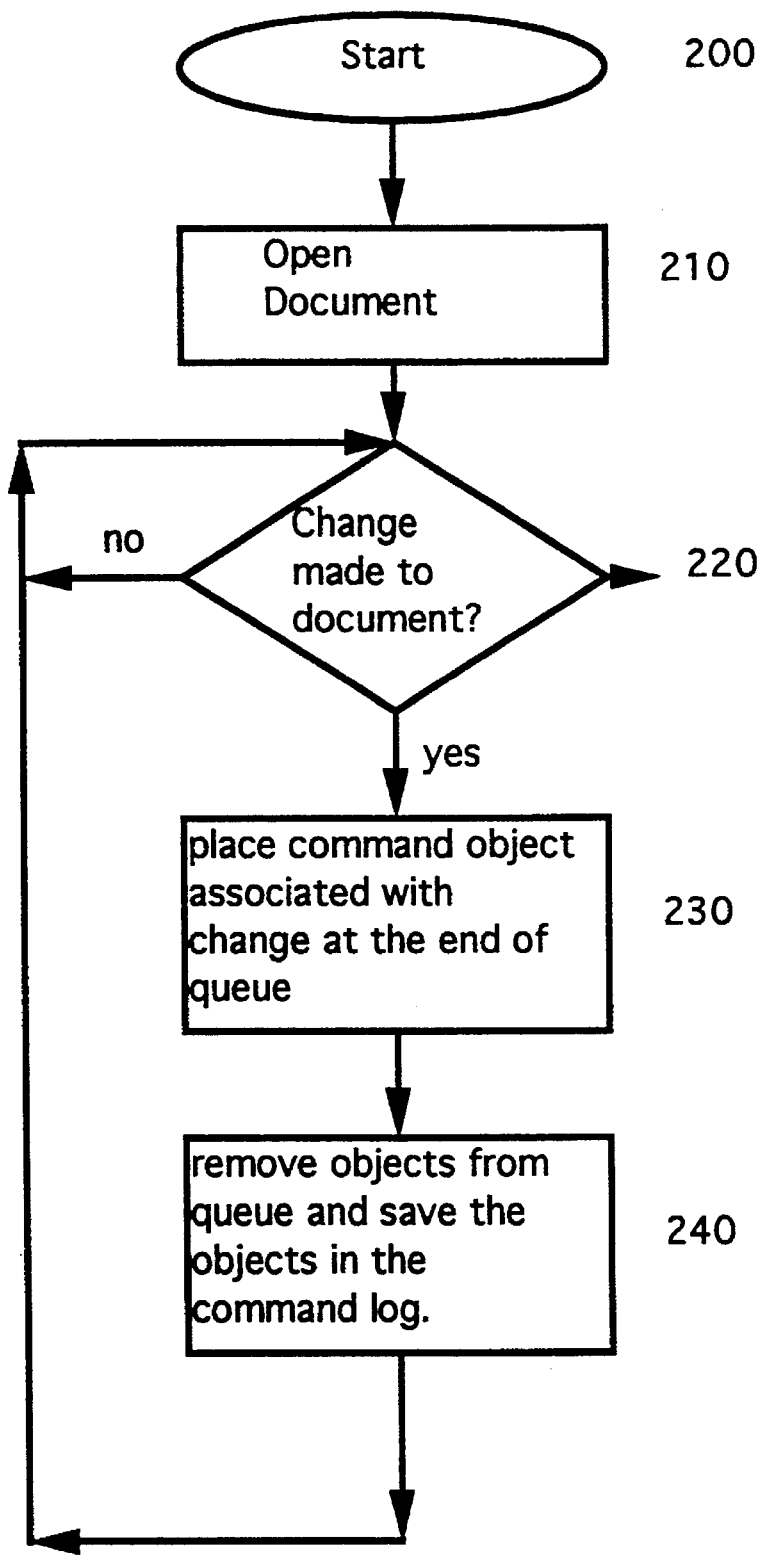
FIGS. 2A & 2B are flowcharts presenting the processing that transpires in accordance with a preferred embodiment.
Figure 2B:
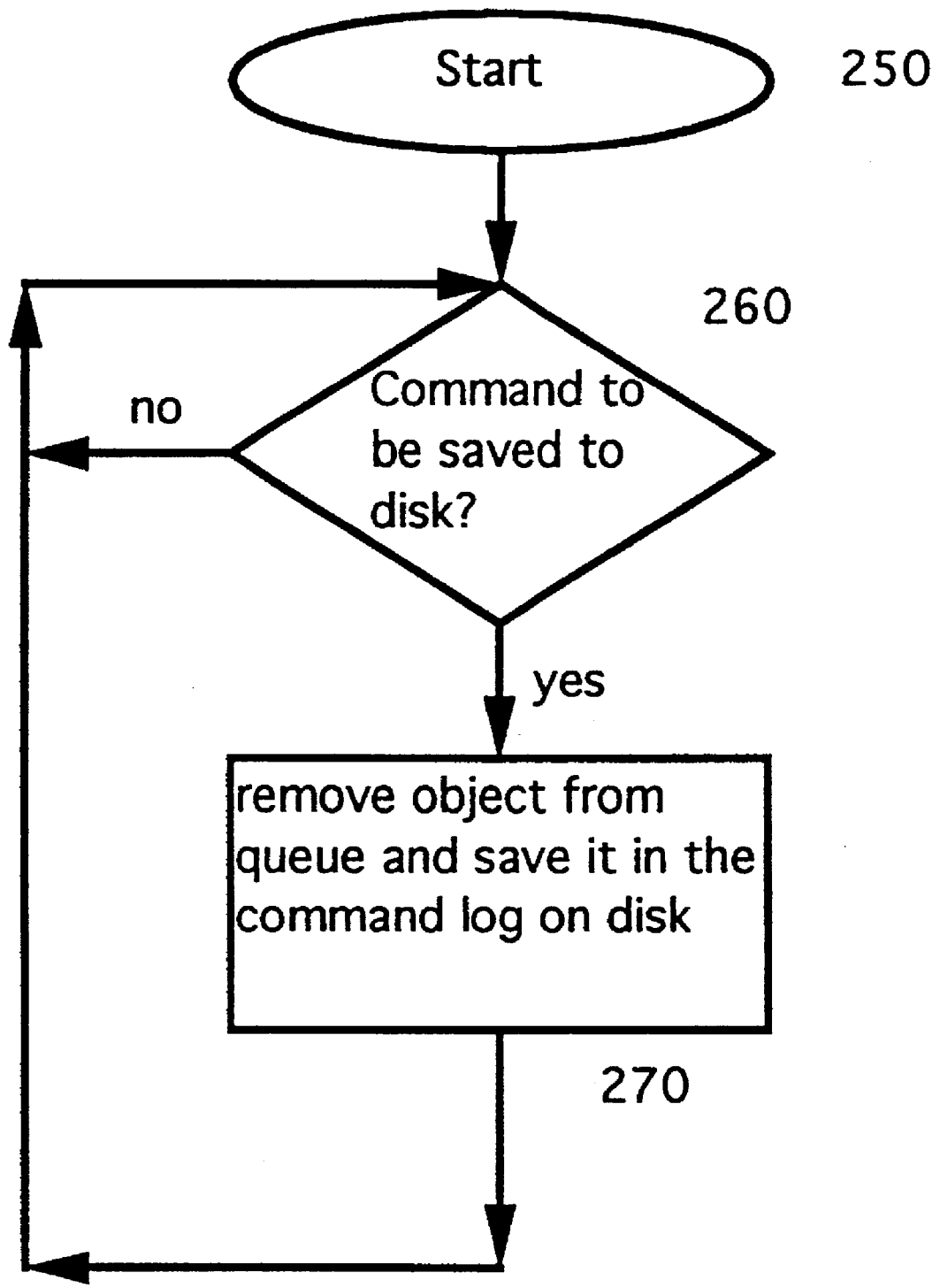

FIGS. 2A–2B are a flowchart presenting the processing that transpires in accordance with a preferred embodiment. Processing commences at terminal 200 and immediately passes to function block 210 to open a document by retrieving the document from a disk or other storage device. A document could include text, graphic, image, audio or other information. Decision block 220 detects changes as they are made to the document. Then, for each change made to the document, a command object is built and placed at the end of a queue in storage as shown in function block 230. Finally, a background task, shown in function block 240, is responsible for building the log in a non-volatile store based on objects in the queue.

The background task schematically illustrated as function block 240 is shown in more detail in FIG. 2B. In particular, the background task starts at terminal 250 and proceeds to decision block 260 where a determination is made whether the command object needs to be saved to the disk. If the command object does not need to be saved to the disk, decision block 260 directs processing back to decision block 260 where the next command object is examined. If the decision in block 260 is that the command object does need to be saved to the disk, then processing passes to block 270 in which the command object is removed from the temporary queue and saved to the command log located on the disk. After processing of block 270 is completed, processing flow returns to decision block 260 where the next command object in the queue is examined. Processing continues in this manner until all command objects in the queue are examined and stored to the disk, if appropriate.

When a user opens a document the following processing occurs:

the document's saved image is retrieved from a disk, cache or other memory.

If the command log is not empty, the commands in the log are replayed.

Figure 3:
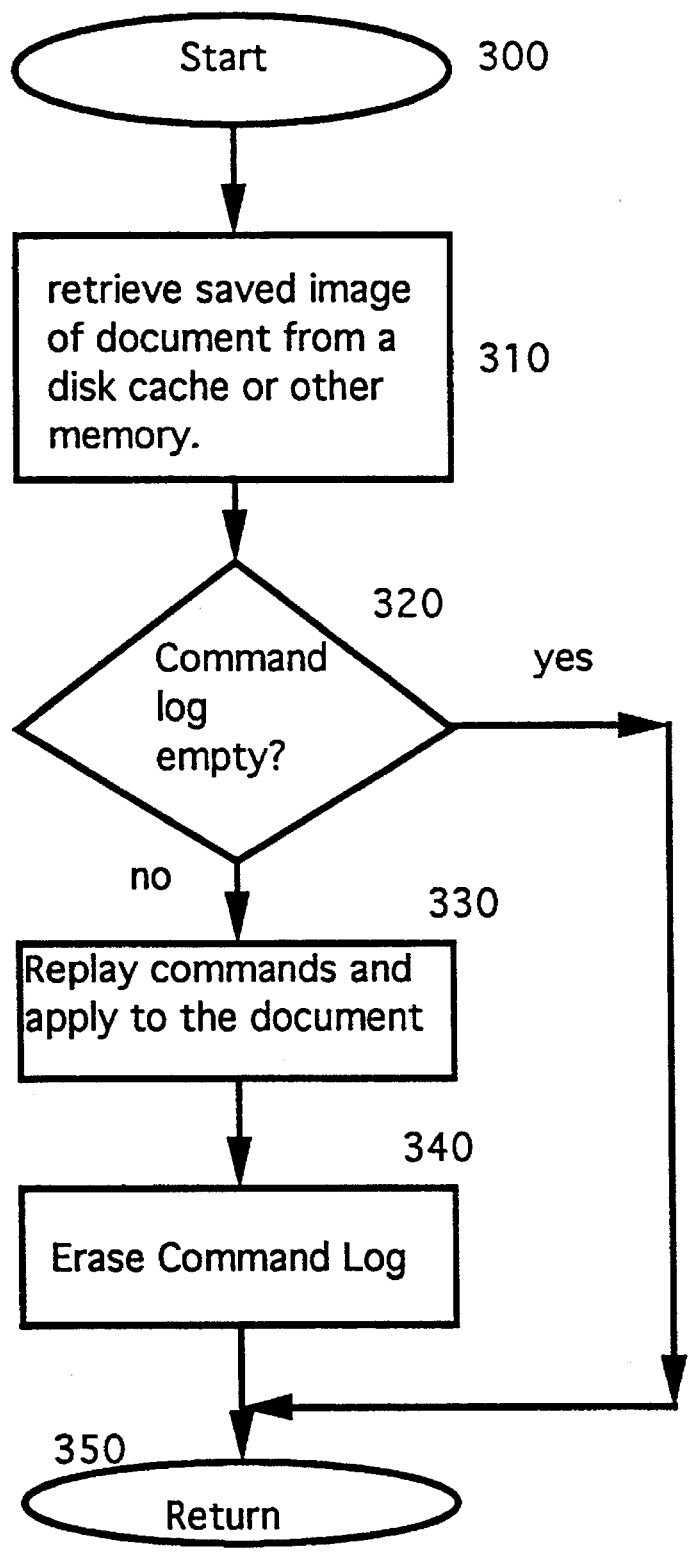
FIG. 3 is a flowchart presenting processing that transpires when a document is restored in accordance with a preferred embodiment.

FIG. 3 is a flowchart presenting processing that transpires when a document is restored in accordance with a preferred embodiment. Processing commences at terminal 300 and immediately passes to function block 310 to retrieve a stored document from a disk, disk cache or other memory. A decision is then performed at decision block 320 to determine if the command log is empty. If so, then the document is complete and control is passed back at terminal 350. If not, then the commands stored in the log are replayed, in order, and applied to the document as shown in function block 330, the command log is erased at function block 340, and control is returned at terminal 350.

At certain points in time, the document is saved:

Save the entire document into the saved image.

Erase the command log.

Figure 4:
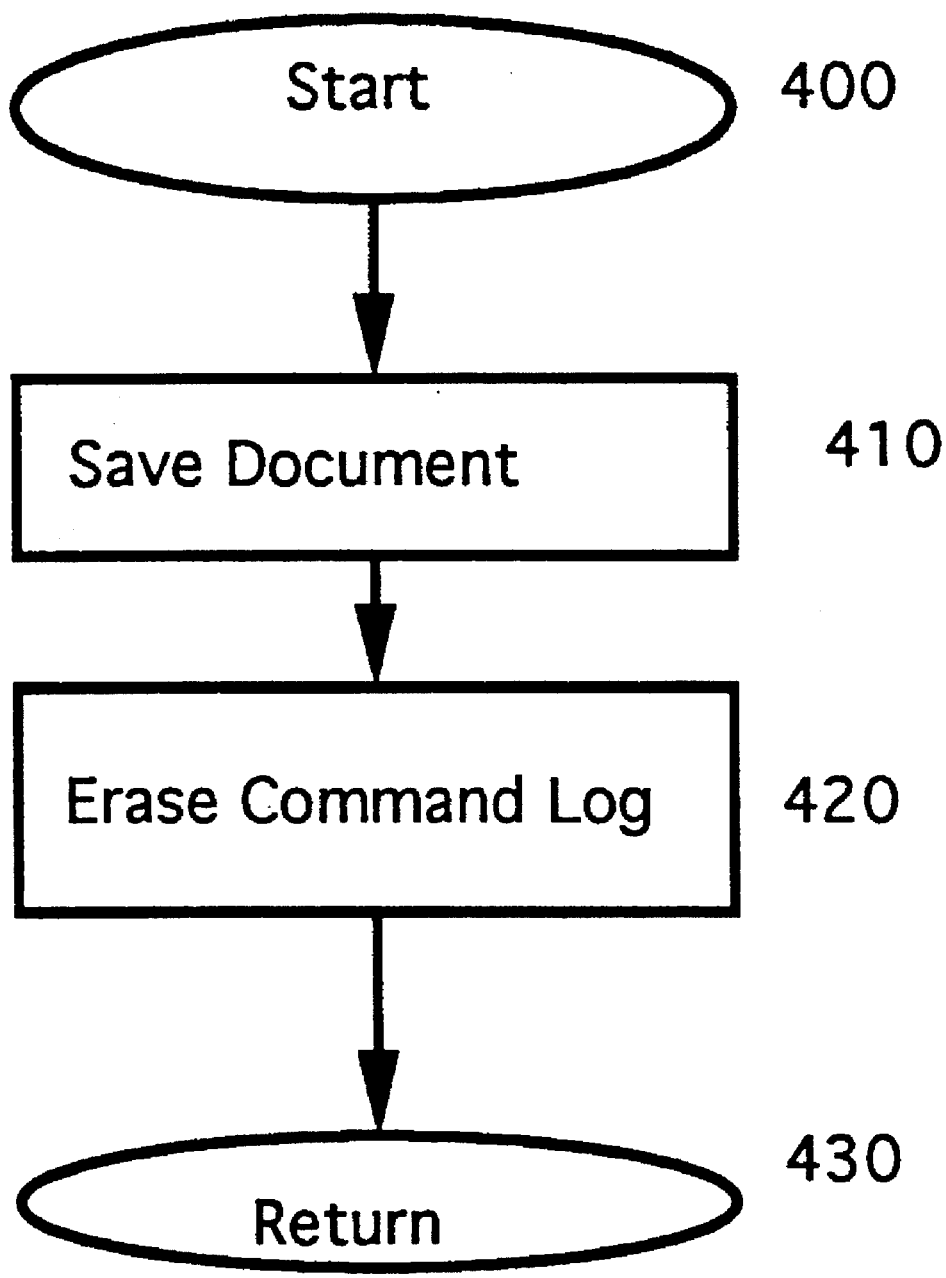
FIG. 4 is a flowchart presenting the logic associated with saving a document in accordance with a preferred embodiment.

FIG. 4 is a flowchart presenting the logic associated with saving a document in accordance with a preferred embodiment. Processing commences at terminal 400 and immediately passes to function block 410 to save the document. Then, the command log is erased at function block 420 and control is returned at terminal 430. This processing can occur at a user request, a user specified time, or automatically when a document is closed.

The filing architecture defines an abstract model store that contains both the saved image and a command log. A document consists of a group of separate model objects that the model store provides access to. The model objects include a document image at the level of the individual models. Typically, the model store is saved on disk, but one of ordinary skill in the art will readily recognize that the model store can reside in memory, cache, or other storage mediums.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for modifying, in response to user open, modify and save commands, document data representing an original document, the document data being resident in a non-volatile storage, the apparatus comprising:

(a) means responsive to a user open command for copying the original document data into a workspace of a volatile storage;

(b) means responsive to each user modify command for creating a command object containing command data identifying a portion of the original document data in the workspace and command methods for modifying the original document data portion;

(c) means responsive to each command object for executing command methods in each command object to modify the original document data portion in the workspace to create a modified document data portion in the workspace;

(d) means responsive to each user modify command for storing the created command object in a log in the non-volatile storage;

(e) means responsive to a user save command for overwriting the original document data in the non-volatile storage with modified document data in the workspace; and (f) means responsive to the overwriting of the original document data for erasing command objects in the log in the non-volatile storage.

2. The apparatus as recited in claim 1 wherein the command object contains undo command methods for operating on the modified document data portion to restore the modified data portion to the original data portion.

3. The apparatus as recited in claim 1 wherein the command object contains redo command methods for operating on the original document data portion to regenerate the modified data portion.

4. The apparatus as recited in claim 1 further comprising means for containing the original document data and a log for storing the command objects.

5. The apparatus of claim 1 wherein the means for storing includes a queue in the volatile storage for temporarily retaining command objects before the command objects are written to the log by the storing means.

6. The apparatus of claim 5 wherein the storing means includes processing means for removing the command objects from the queue and storing the command objects to the log as a task with lower priority than a priority of a document processing task.

7. The apparatus of claim 1 further including means for restoring a document after a crash including:

means for accessing the original document data in the non-volatile storage, which data was not completely overwritten by the overwriting means as a result of the crash;

means for obtaining the command objects in the log;

means for applying command objects obtained from the log to the means for executing command methods in each command object.

8. The apparatus of claim 7 wherein the restoring means further includes means for erasing the log after the document is restored by applying all of the command objects in the log to the original document data.

9. A method for modifying, in response to user open, modify and save commands, document data representing an original document, the document data being resident in a non-volatile storage, the method comprising the steps of:

(a) copying the original document data into a workspace of a volatile storage in response to a user open command;

(b) creating a command object containing command data identifying a portion of the original document data in the workspace and command methods for modifying the original document data portion in the workspace in response to each user modify command;

(c) executing command methods in each command object to modify the original document data portion in the workspace to create a modified document data portion in the workspace in response to each command object; and (d) storing the created command object in a leg in the non-volatile storage in response to each user modify command;

(e) overwriting the original document data in the non-volatile storage with modified document data in the workspace in response to a user save command; and (f) erasing command objects in the log in the non-volatile storage in response to the overwriting of the original document data.

10. The method as recited in claim 9 wherein step (b) comprises the step of:

(b1) creating a command object containing undo command methods for operating on the modified document data portion to restore the modified data portion to the original data portion.

11. The method as recited in claim 9 wherein step (b) comprises the step of:

(b2) creating a command object containing redo command methods for operating on the original document data portion to regenerate the modified data portion.

12. The method as recited in claim 9 further comprising the step of:

(g) creating a mechanism for containing the original document data and a log for storing the command objects.

13. The method of claim 9 wherein step (d) includes the step of (d.1) retaining a queue resident in the volatile storage for retaining command objects before they are written to the log.

14. The method of claim 13 wherein step (d) further includes the step of (d.2) moving the command objects from the queue to the log as a lower priority task than a document processing task.

15. The method of claim 9 further including the step of (g) restoring a document after a crash from the document data in the non-volatile storage, which data was not completely overwritten as a result of the crash by accessing the document data on the non-volatile storage, obtaining command objects from the log, and executing command methods in each obtained command object to modify the document data.

16. The method of claim 15 further including the step (h) after step (g), erasing the log.

* * * * *